(12) United States Patent
Foerster et al.

(10) Patent No.: US 11,861,474 B2
(45) Date of Patent: *Jan. 2, 2024

(54) DYNAMIC PLACEMENT OF COMPUTATION SUB-GRAPHS

(71) Applicant: DeepMind Technologies Limited, London (GB)

(72) Inventors: Jakob Nicolaus Foerster, San Francisco, CA (US); Matthew Sharifi, Kilchberg (CH)

(73) Assignee: DeepMind Technologies Limited, London (GB)

( * ) Notice: Subject to any disclaimer, the term of this patent is extended or adjusted under 35 U.S.C. 154(b) by 0 days.

This patent is subject to a terminal disclaimer.

(21) Appl. No.: 18/094,308

(22) Filed: Jan. 6, 2023

(65) Prior Publication Data

US 2023/0237375 A1  Jul. 27, 2023

Related U.S. Application Data

(63) Continuation of application No. 16/761,653, filed as application No. PCT/US2018/015896 on Jan. 30, 2018, now Pat. No. 11,551,144.

(51) Int. Cl.
*G06N 20/00* (2019.01)
*G06F 16/901* (2019.01)

(52) U.S. Cl.
CPC ......... *G06N 20/00* (2019.01); *G06F 16/9024* (2019.01)

(58) Field of Classification Search
CPC ... H04L 41/147; H04L 41/0893; H04L 45/02; H04L 41/082; H04L 41/0896; H04L 12/2816; H04L 12/282; G06N 20/00; G06N 3/08; G06N 3/105; G06N 3/0445; G06F 16/9024; G06F 9/5066; G06F 3/167; G10L 15/22; G10L 15/30; G10L 2015/223

See application file for complete search history.

(56) References Cited

U.S. PATENT DOCUMENTS

| | | |
|---|---|---|
| 2011/0004574 A1 | 1/2011 | Jeong et al. |
| 2013/0205028 A1 | 8/2013 | Crockett et al. |

(Continued)

OTHER PUBLICATIONS

Arxiv.org [online] "Asynchronous Methods for Deep Reinforcement Learning," Feb. 4, 2020, retrieved on Jul. 10, 2020, retrieved from URL>https://arxiv.org/abs/1602.01783, 19 pages.

(Continued)

*Primary Examiner* — Jung Liu
(74) *Attorney, Agent, or Firm* — Fish & Richardson P.C.

(57) ABSTRACT

Methods, systems, and apparatus, including computer programs encoded on computer storage media, for assigning operations of a computational graph to a plurality of computing devices are disclosed. Data characterizing a computational graph is obtained. Context information for a computational environment in which to perform the operations of the computational graph is received. A model input is generated, which includes at least the context information and the data characterizing the computational graph. The model input is processed using the machine learning model to generate an output defining placement assignments of the operations of the computational graph to the plurality of computing devices. The operations of the computational graph are assigned to the plurality of computing device according to the defined placement assignments.

20 Claims, 4 Drawing Sheets

(56) References Cited

U.S. PATENT DOCUMENTS

| | | |
|---|---|---|
| 2016/0182329 A1 | 6/2016 | Armolavicius et al. |
| 2017/0124452 A1 | 5/2017 | Tucker et al. |
| 2017/0171761 A1 | 6/2017 | Guvenc |
| 2018/0098330 A1 | 4/2018 | Nguyen et al. |
| 2018/0137858 A1 | 5/2018 | Saxena et al. |
| 2018/0227223 A1 | 8/2018 | Hughes |
| 2018/0322388 A1 | 11/2018 | O'Shea |
| 2019/0324437 A1 | 10/2019 | Cella et al. |
| 2020/0296002 A1 | 9/2020 | Adjodah et al. |
| 2021/0006949 A1 | 1/2021 | Amini et al. |

OTHER PUBLICATIONS

Arxiv.org [online] "Conditional Image Generation with PixelCNN Decoders," Jun. 16, 2016, Jul. 10, 2020, retrieved from URL<https://arxiv.org/abs/1606.05328, 13 pages.

Arxiv.org [online] "Continuous control with deep reinforcement learning," Sep. 9, 2015, retrieved on Jul. 10, 2020, retrieved from URL<https://arxiv.org/abs/1509.02971, 14 pages.

Arxiv.org [online] "Counterfactual Multi-Agent Policy Gradients," May 24, 2017, retrieved on Jul. 10, 2020, retrieved from URL<https://arxiv.org/abs/1705.08926, 10 pages.

Arxiv.org [online] "WaveNet: A Generative Model for Raw Audio," Sep. 12, 2016, retrieved on Jul. 10, 2020, retrieved from URL>https://arxiv.org/abs/1609.03499, 15 pages.

Mnih et al., "HumanLevel Control Through Deep Reinforcement Learning," Nature, 2015, 518(7540):529-533.

PCT International Preliminary Report on Patentability in International Appln. No. PCT/US2018/015896, dated Aug. 13, 2020, 9 pages.

PCT International Search Report and Written Opinion in International Appln. No. PCT/US2018/015896, dated Oct. 18, 2018, 9 pages.

Schmidhuber et al., "Long Short-Term Memory," Neural Computation, 1997, 9(8):1735-1780.

DYNAMIC PLACEMENT OF COMPUTATION SUB-GRAPHS

CROSS-REFERENCE TO RELATED APPLICATIONS

This application is a continuation application of, and claims priority to, U.S. application Ser. No. 16/761,653, filed on May 5, 2020, which is a national stage application under § 371 and which claims priority to International Application No. PCT/US2018/015896, filed on Jan. 30, 2018. The disclosures of the prior applications are considered part of and are incorporated by reference in the disclosure of this application.

BACKGROUND

This specification relates to integrating machine learning into placement of computational graph operations for execution across computing devices in a computational environment.

A computational environment can have multiple computing devices in communication with one another (e.g., connected by a network). One device may receive a computationally intensive task, in the form of a computational graph, that can be challenging for the device to execute given the computational resource and energy impact to the device.

A machine learning model receives input and generates output based on its received input and on values of model parameters.

SUMMARY

This specification describes technologies for dynamically assigning computational graph operations to computing devices in a computational environment. These technologies generally involve methods and systems for applying machine learning algorithms to determine optimal execution placement for computational graph operations given specific computational environment constraints and optimization goals.

In general, one innovative aspect of the subject matter described in this specification can be embodied in methods that include the actions of assigning computational graph operations to a plurality of computing devices in a computing environment according to placement assignments that are defined by a machine learning model. Other embodiments of this aspect include corresponding computer systems, apparatus, and computer programs recorded on one or more computer storage devices, each configured to perform the actions of the methods. For a system of one or more computers to be configured to perform particular operations or actions means that the system has installed on it software, firmware, hardware, or a combination of them that in operation cause the system to perform the operations or actions. For one or more computer programs to be configured to perform particular operations or actions means that the one or more programs include instructions that, when executed by data processing apparatus, cause the apparatus to perform the operations or actions The foregoing and other embodiments can each optionally include one or more of the following features, alone or in combination. In particular, one embodiment includes all the following features in combination.

An example implementation includes obtaining data characterizing a computational graph comprising a plurality of nodes representing operations and directed edges representing data dependencies. Context information for a computational environment in which to perform the operations of the computational graph is received. The context information includes data representing a network connecting a plurality of computing devices in the computational environment. Model input is generated which includes at least the context information and the data characterizing the computational graph. The model input is processed using a machine learning model to generate an output defining placement assignments of the operations of the computational graph to the plurality of computing devices. The operations of the computational graph are assigned to the plurality of computing devices according to the defined placement assignments.

The machine learning model may be trained to generate placement assignments for the operations of the computational graph that satisfy at least one pre-determined weight for one or more optimization goals.

Prior to processing the model input using the machine learning model, a constraint may be received that identifies at least one optimization goal for graph processing and the model input may be generated using the constraint in addition to the context information and the data characterizing the computational graph.

The constraint may be in the form of a vector that assigns a respective weight to one or more optimization goals.

The one or more optimization goals may include one or more of: latency, battery, energy impact, bandwidth, and computational time.

The context information may further comprise information defining at least one computational capability of the plurality of computing devices in the computational environment including available battery life, available processing capability, available storage capacity, available memory, or network speed.

The data representing a network connecting the plurality of computing devices may include data representing one or more of: measured or expected latency of the network, network speed, and available computing devices on the network.

The computational graph may include repeated operations and after determining a placement assignment for one of the repeated operations, subsequent repeated operations may be assigned to a same placement assignment for a predetermined number of computational time steps.

After the predetermined number of computational time steps, the placement assignments of the repeated operations may be reevaluated.

The computational graph or sub-graph may represent a particular task. After determining placement assignments for the operations of the computational graph or sub-graph representing the particular task, a policy may be created that defines placement assignments of the operation of the particular task from the determination of placement assignments for the operations. A second computational graph or sub-graph representing the same particular task may be received and the placement assignments of the operations of the second computational graph or sub-graph may be determined from the created policy.

A created policy may be reevaluated after a predetermined number of computational time steps.

The predetermined number of computational time steps may be determined based on a cost associated with re-computing the policy.

The subject matter described in this specification can be implemented in particular embodiments so as to realize one or more of the following advantages.

An operation placement assignment system can dynamically determine the computational devices on which to execute computational graph operations in a computational environment.

While conventional techniques use precomputed heuristics, mappings, or defined rules to assign operations to devices, the operation placement assignment system is able to determine optimal execution placement based on current constraints in a computational environment without having to store or retrieve predefined heuristics, mappings, or rules. Instead, the operation placement assignment system uses a machine learning model that is trained on many different constraints. This machine learning model can dynamically predict optimal placement assignments for computational tasks in any given computational environment.

By dynamically determining optimal computational operation placement, the operation placement assignment system ensures the most efficient use of resources and placement of operations that will achieve defined optimization goals. That is, because the system can distribute different computational graphs or even the same computational graphs to different devices when faced with different computational environment characteristics, the system can effectively utilize the computational capacity of the various devices in the computational environment to effectively execute the computational graph.

The operation placement system learns, by training, a mapping from computational capabilities and optimization goals to optimal placement. By using the system, computational graph operations can be assigned to computational devices in a way that increases execution speed for the operations. The system can also quickly and easily change the placement of operations based on changes in the computational environment to ensure optimal execution even with these changes in the environment.

If the system is used on a mobile device, the optimal placement may result in power savings. In some cases, lower user-perceived latency for machine learning-backed operations may be achieved.

The details of one or more embodiments of the subject matter of this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

The specification generally describes an operation placement assignment system that generates dynamic placement assignments that assign computationally-intensive operations represented in a computational graph across various devices in a computational environment. The operation placement assignment system improves execution speed of the computational graph and optimizes resource usage when the devices execute the operations of the computational graph.

Devices in a computational environment often run applications that frequently run computationally expensive machine learning models using deep neural networks. These machine learning tasks can be computationally intensive, requiring significant resources from the devices executing them. For example, some machine learning models may have many parameters, e.g., millions of parameters, and are therefore difficult to deploy on a computing device with limited computational resources, e.g., on a mobile device.

Each machine learning task can be in the form of a computational graph that includes nodes connected by directed edges. Each node in a computational graph represents an operation. An incoming edge to a node represents a flow of an input into the node, i.e., an input to the operation represented by the node. An outgoing edge from a node represents a flow of an output of the operation represented by the node to be used as an input to an operation represented by another node. Thus, a directed edge connecting a first node in the graph to a second node in the graph indicates that an output generated by the operation represented by the first node is used as an input to the operation represented by the second node. For example, a computational graph can represent the operations performed by a machine learning model to determine an output for a received input. Thus, for example, the directed edges may represent dependencies of a neural network. Activations can flow in the direction of the edges. As another example, the computational graph can represent the operations performed to train a machine learning model on training data. Thus the operations may comprise determining modified values for the parameters.

An example operation placement assignment system assigns computational graph operations (e.g., machine learning operations or other types of computationally-intensive operations) across devices communicating with one another in a computational environment so that the tasks can be performed quickly and efficiently.

Figure 1:
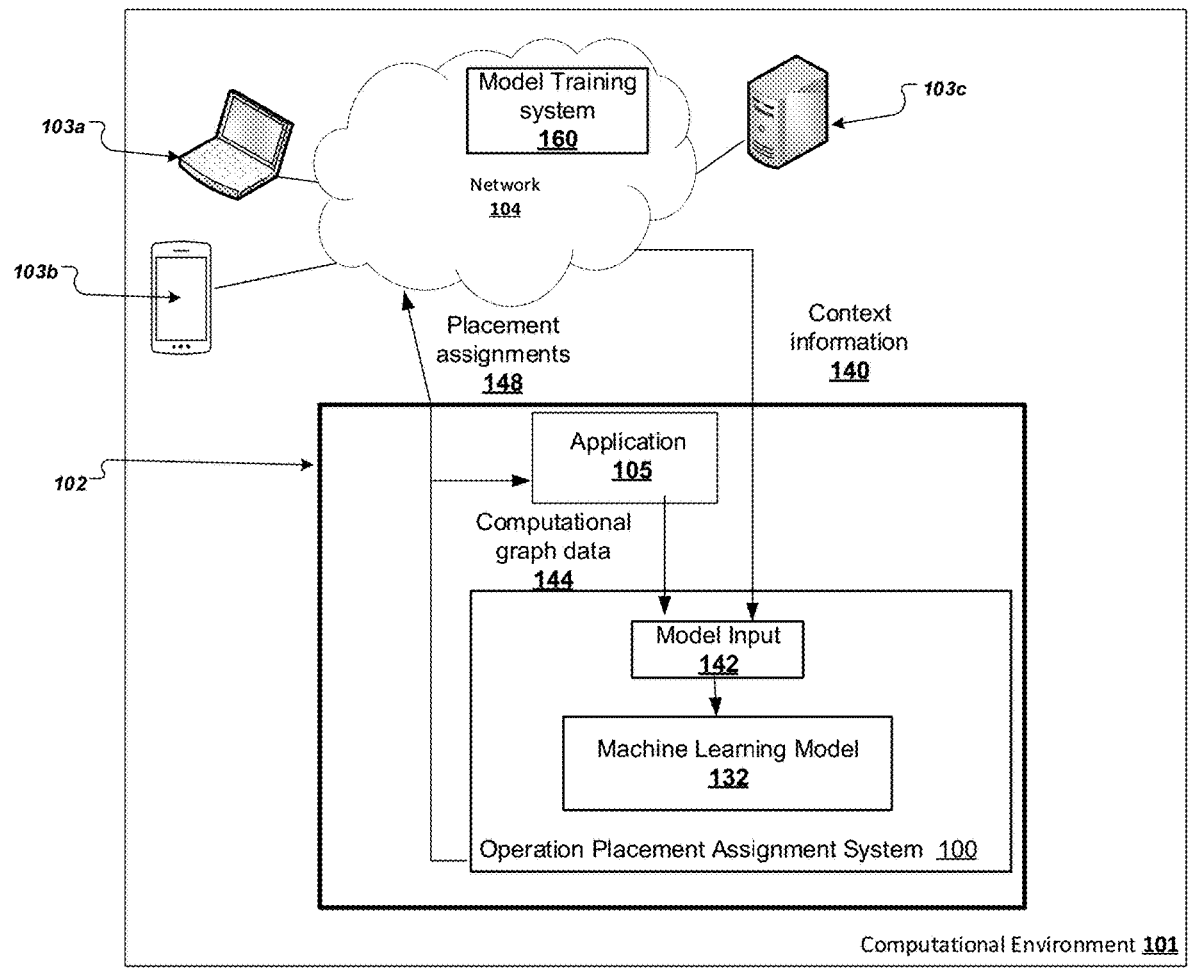
FIG. 1 is system for dynamically determining placement of operations in a computational environment.

FIG. 1 illustrates an example operation placement assignment system 100. The operation placement assignment system 100 is an example of a system implemented as computer programs on one or more computers in one or more locations, in which the systems, components, and techniques described below can be implemented. The operation placement assignment system 100 determines optimal placement of computational graph operations for an application 105 running on a local device 102 in a computational environment 101.

Since these operations can be resource-intensive, e.g., when the operations are machine learning operations, requiring large amounts of processing power and energy, running the operations locally on a device executing the application may make the device, as well as the operations, slow and inefficient, may undesirably shorten the battery life of the device, or otherwise undesirably impact the performance of the device. Therefore, the operation placement assignment system 100 determines operation placement assignments across multiple devices, in a way that provides optimal execution of the operations.

Ideal placement of graph operations depends on many variables including computing capabilities and constraints of computing devices in addition to optimization goals. For example, the operation placement assignment system 100 may determine that running operations locally makes a device 102 slow and inefficient. However, the operation placement system 100 needs to balance the speed and efficiency of the local device 102 with the capabilities of remote devices 103*a-c* and the network connectivity and network speed of a data communication network 104 connecting the local device 102 and the remote devices 103*a-c* when determining placement and subsequent execution of the operations. Remote devices may be other devices on a local network or may be physical or virtual devices in a cloud-computing environment (e.g., device 103*d*). It can be difficult for an application developer to account for all the variables and determine the optimal execution location for each particular computational operation when developing the application.

As shown in FIG. 1, the operation placement assignment system 100 uses a machine learning model 132 to determine the optimal execution placement for any computational graph given context information from a computational environment and data characterizing the computational graph.

In some implementations, the machine learning model 132 is a neural network, e.g., a deep neural network. Neural networks are machine learning models that employ one or more layers of neurons to generate an output, e.g., one or more classifications, for a received input. Deep neural networks include one or more hidden layers in addition to an output layer. The output of each hidden layer is used as input to the next layer in the network, i.e., the next hidden layer or the output layer. Each layer of the neural network generates an output from a received input in accordance with current values of a respective set of parameters for the layer.

As illustrated in FIG. 1, the machine learning model is trained by a model training system 160 located in the cloud, i.e., located remotely from the local device 102, and then deployed on the local device 102, e.g., over the network 104.

In other examples, however, the model training system 160, the placement assignment system 100, and, therefore, the machine learning model 132 are both implemented in the cloud, e.g., on one or more server computers that are remote from the local device 102. In these examples, the local device 102 can send the data necessary for the system 100 to generate a placement assignment to the system 100 over the network 104 and receive the generated placement assignment from the system 100 over the network 104.

Neural networks can be trained using reinforcement learning to generate predicted outputs. Generally, in a reinforcement learning training technique, a reward is received and is used to adjust the values of the parameters of the neural network. The training process for the machine learning model 132 is described in more detail below.

The operation placement assignment system 100 generates a model input 142 including context information 140 i.e., data characterizing the current state of the computational environment 101, and computational graph data 144, i.e., data characterizing the computational graph that is to be executed, and provides the model input 142 as input to the machine learning model 132.

The machine learning model 132 processes the model input 142 to determine placement assignments 148 of the computational graph operations across remote computing devices 103*a-c* and the local computing device 102 in the computational environment 101. Each placement assignment is an assignment of a specific computational operation in the computational graph to a computing device in the computational environment.

For example, if the machine learning model determines from the context information that the local device 102 does not have enough battery power to perform a particular machine learning operation or group of operations to completion, the model can assign the operation or group of operations to a remote device 103*a-c*.

As another example, the machine learning model 132 can learn to assign execution of compute-heavy parts of a computational graph to remote devices with better processing capabilities than the local device, especially when little data is required to be sent over a network connection or the local device has access to good data connection.

The machine learning model 132 can additionally or alternatively learn to dynamically change placement assignments based on the compute resources available on the local device. For example, if a local device has a fast GPU, the machine learning model takes the processing speed into consideration when determining whether to send computational data across a network to a remote device for evaluation and execution of an operation.

The operation placement assignment system 100 provides the determined placement assignments 148 to the application 105 or process that provided the computational graph data. The application 105 or process then uses the placement assignments 148 to assign the operations of the computational graph to be executed by the devices of the computational environment 101 corresponding to the placement assignments.

Figure 2:
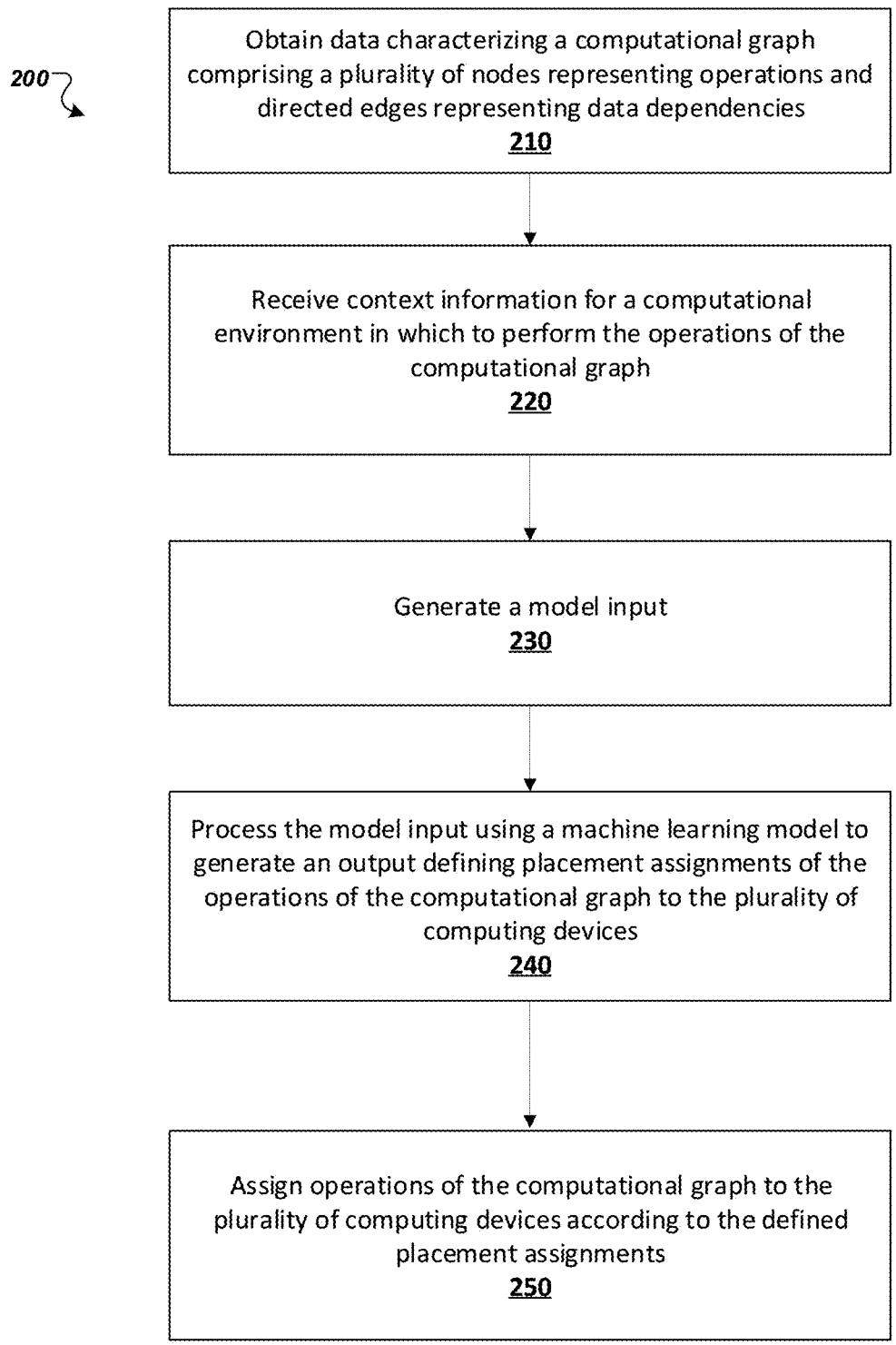
FIG. 2 illustrates an example flow diagram of an example process for determining optimal placement of computational graph operations given a specific computational environment.

FIG. 2 illustrates an example flow diagram of an example process 200 for determining optimal placement of computational graph operations given a specific computational environment. For convenience, the process 200 will be described as being performed by a system of one or more computers, located in one or more locations, and programmed appropriately in accordance with this specification. For example, an operation placement system, e.g., the operation placement system 100 of FIG. 1, appropriately programmed, can perform process 200.

As illustrated in FIG. 2, to determine placement assignments for a computational graph, the system obtains data characterizing the computational graph (210). The computational graph includes a plurality of nodes representing operations and directed edges representing data dependencies.

The data characterizing the computational graph can be data from an application 105 needing to perform computationally-intensive tasks, e.g., machine learning tasks, represented by the computational graph.

The data can include a description of the computational task to be carried out, the data required to carry out the computational task including data dependencies, the operations of the computational task, and the structure of the computational task including information about the operations to execute and any metadata associated with the operations.

The computational graph data may also include information about the location of data required to carry out the computational task, e.g., the device on which the data is stored, the kind of memory in which the data is stored, or the network connection/speed required to access the data.

In some implementations, the system embeds the operations of the computational graph. That is, the system generates or receives a respective embedding for each operation in the computational graph that is to be placed on one of the devices in the computational environment. An embedding is an ordered collection of numeric values, e.g., a vector of floating point or quantized floating point values, that represents an operation in an embedding space.

For each input graph, the system collects the types of the graph's operations. An operation's type describes the underlying computation (e.g., matrix multiply or conversion to two dimensions) of the operation. For each type, the system stores a tunable embedding vector.

The system generates an embedding by recording the size of each operation's list of output tensors and concatenating them into a fixed-size zero-padded list, referred to as the output shape.

The system also identifies the one-hot encoding vector that represents the operations that are direct inputs and outputs to each operation, i.e., that are connected to the node representing the operation by an edge.

The embedding of each operation is the concatenation of the embedding operation's type, its output shape, and its one-hot encoded, adjacency information. Other data that may be included may be: the depth of an operation within the network, a name of the operation, or the computational cost of an operation.

The system also receives context information for a computational environment in which to perform the operations of the computational graph (220).

The context information for the computational environment can include data identifying the available computing devices in the computational environment, the processing and/or storage capabilities of the available computing devices, available memory on the available computing devices, data about a network connecting the devices in the computational environment, e.g., one or more of the network bandwidth, a latency of communication on the network, or the network speed, battery life of the available computing devices, and other information about the computational environment 148 needed to make a decision about the appropriate device in which to execute a particular operation. Context information may also include current battery level or whether a device is charging.

The context information may be represented in a manner which facilitates combining this information with the computational graph data for the model input, for example generating an embedding which, for each device, concatenates the device input(s) and output(s) and properties as described above.

The computational environment may include any number of computing devices that can be connected together (e.g., by a wireless network, a wired network, Bluetooth, near field communication, RFID, or other communication technology). For example the computing devices may include devices in datacenters, personal computing devices, mobile devices, virtual devices, smart devices (e.g., a cloud-based voice service, a smart personal/home assistant, a smart thermostat, a digital media player, a smart appliance, a smart plug, or a smart thermostat), tablets, cloud computing devices, or any other computing devices with processing capabilities and/or data storage.

Any computing device can be the local computing device running the application that needs to execute the computationally-intensive task. For example, a smart device may need to perform voice recognition. The smart device can run the machine learning model to determine placement of the voice recognition operations or the smart device can have a remote device, such as devices in the cloud, run the machine learning model to determine placement of the voice recognition operations. The voice recognition operations can then be executed on the determined devices in the computational environment and the results can be provided to the smart device for further processing.

In some implementations, the system can additionally, optionally, receive, e.g., from the application, a constraint input that identifies which optimization goals should be emphasized during the processing of the graph. For example, the application may specify respective weights for one or more optimization goals, e.g., latency, battery, energy impact, bandwidth, and computational time. The constraints can be in the form of a parameterized vector that assigns a respective weight to each of the optimization goals.

The system combines the computational graph data, the context information, and optionally the set of optimization constraints, to generate a model input for the system (230). Generating the model input includes transforming computational graph data and context information into an input of the type that the machine learning model is configured to receive. For example, the system can create a feature vector of one or more dimensions in which each attribute of the context information or graph operations data occupy one or more dimensions in the vector. Since the features of the computational graph and the context information may vary, the input length of the feature vector also varies in length depending on the features provided. The process for generating input for the model depends on the architecture of the model. In some implementations, the system generates a sequence of the received data with different kinds of data in predetermined positions in the sequence.

The system then processes the model input using a machine learning model to generate an output defining placement assignments of the operations of the computational graph to computing devices in the computational environment (240). That is, as described above, the machine learning model has been trained to generate placement assignments for the operations of the computational graph that satisfy one or more optimization goals. In cases where the model input includes weights for the optimization goals, the machine learning model has been trained to generate placement assignments for the operations of the computational graph that satisfy the weights for the one or more optimization goals in the model input. In cases where the model input does not include weights for the optimization goals, the machine learning model has been trained to generate placement assignments for the operations of the computational graph that satisfy pre-determined weights for the one or more optimization goals. In some implementations, the output can be a sequence, e.g., a sequence of operator→placement instructions.

A variety of machine learning models including convolutional networks and recurrent networks can be used to generate these outputs.

For example, in some implementations, the model can be an autoregressive neural network conditioned on the model input. At each time step, the model receives already-generated assignments as input and generates the next assignment depending on these already-generated assignments, conditioned on the model input. The neural network may be a convolutional network as described by A. Oord et al. in "WaveNet: A Generative Model for Raw Audio," https://arxiv.org/abs/1609.03499. As another example, the neural network may be a neural network as described by A. Oord et al. in "Conditional Image Generation with PixelCNN Decoders," https://arxiv.org/abs/1606.05328.

In other implementations, the model can be a recurrent neural network that receives the model input as a sequence. Once the input sequence has been processed, at each time step, the model then predicts an assignment for an operation corresponding to the time step based on the assignment of the operation corresponding to the previous time step. The recurrent neural network may be a recurrent neural network as described by Sepp Hochreither and Jurgen Schmidhuber in "Long Short-Term Memory." Neural Computation 9(8) 1735-1780 (1997).

The model can be run so that it always predicts over all possible placement devices, regardless of the capabilities of the device on which the model is running. If, for example, there is no GPU resource available on the device, the prediction to use a GPU resource can be ignored and the next highest scoring prediction can be used instead.

The context information may be sufficiently rich to allow a large number of different computing environments to be represented. The model output may be relatively more constrained. In a case where a computing environment has more detail than is represented by the model output the environment may be simplified, for example by disregarding details or sub-sets of the environment, to map the output onto the computing environment. In such a case the system may be used recursively, to map to a complex computing environment.

After processing the model input, the system assigns operations of the computational graph to computing devices in the computational environment according to the determined placement assignments (250).

Figure 3:
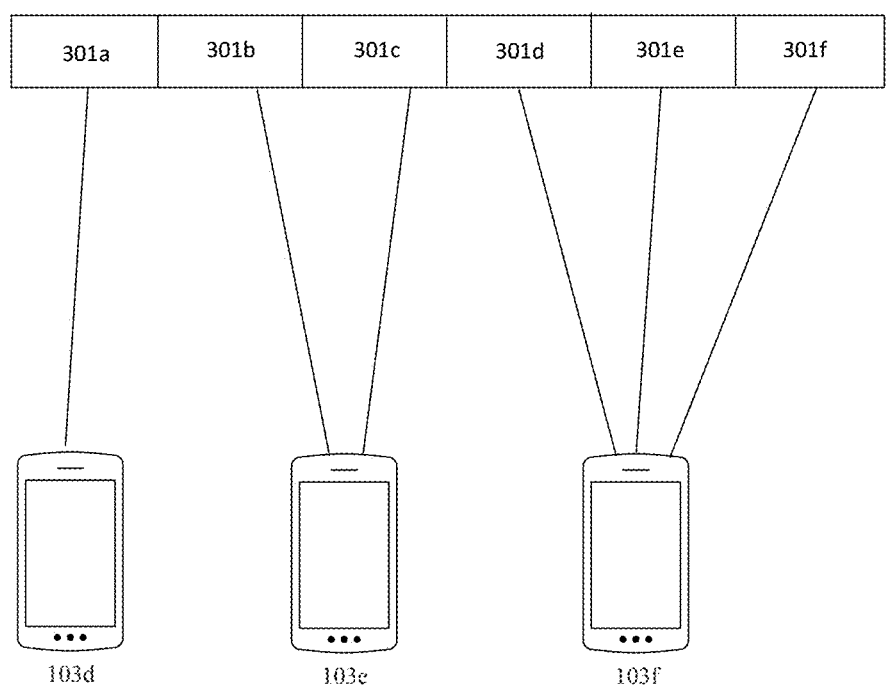
FIG. 3 shows an example of placement of operations over multiple computing devices.

FIG. 3 illustrates example assignments of computational graph operations 201a-f. As shown, devices 103d-f are part of a computational environment that are in communication with one another, e.g., by a network. The system runs the machine learning model 132 on one device in the computational environment, e.g., 103d, using the computational graph data 201a-f and context information from the computational environment. The machine learning model may determine, as shown, that to ensure optimal execution of the computational graph operations and satisfy a reward function on which the machine learning model has been trained, operation 201a should be assigned to device 103d, operations 201b and 201c should be assigned to device 103e, and operations 201d, 201e, and 201f should be assigned to device 103f.

A placement policy may include a definition of placement assignments for the operations of a computational graph or sub-graph thereof. Re-computing a policy for every time step or every time a feature of the computational environment changes may be prohibitively expensive for the system. Therefore, in some implementations, after determining assignments for a computational graph task, the system recognizes a repeated computational graph task or operation and assigns the repeated operations to the assignments previously determined for the task or operation. For example, the computational graph task may be a task of speech recognition. The system can determine which devices to run the operations of the task during one execution of the machine learning model and then repeat the assignments for subsequent speech recognition tasks. The assignments may be valid for a predetermined duration and may be recomputed after the duration is finished. The inferences from the placement model can be reused as long as nothing significantly changes with respect to the context. The system can assign a threshold amount by which each of the context attributes is allowed to change. For example, a network bandwidth change may be acceptable, e.g., not significant, if it is +/−1 Mbps or a battery level change may be insignificant if it is +/−3%.

In some implementations, the determined assignments of computational graph operations can be stored in a cache or data store as a placement policy. The placement policy defines a mapping from the input context information and the specific computational task represented by the graph to computing devices in the computational environment. The system can then use the placement policy for a subsequent computational task if there is a placement policy defined for the computational task. The placement policy may be valid for a specific number of time steps or a predetermined duration. The number of time steps or predetermined duration may be calculated based on the expense, e.g., cost, in terms of time, resource, and energy, associated with evaluating a policy. The placement policy may also be valid as long as a certain number of inputs do not change or the inputs change within a threshold amount as described above.

In order to provide optimal placement assignments, the system trains the machine learning model to predict placement assignments, based on given input. Referring to FIG. 1, the model training system 160 can train the machine learning model 132 in the cloud, i.e., on one or more computers that are remote from the local device. In particular, the model can be trained in simulation or on a real population of devices to predict placements that achieve optimization goals (e.g., an energy vs. speed trade-off).

Figure 4:
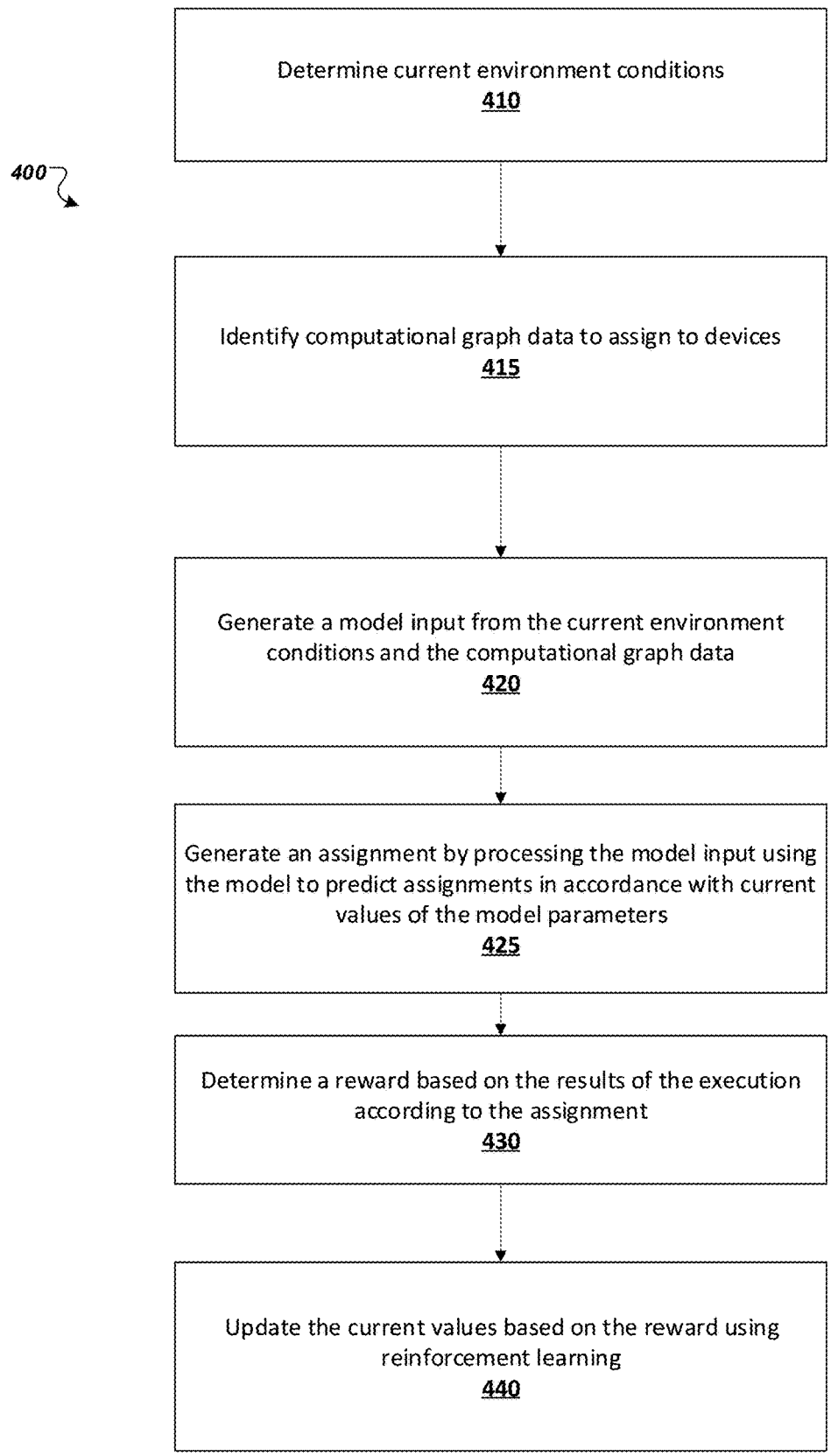
FIG. 4 illustrates an example flow diagram of an example process for training a machine learning model to determine optimal placements of computational graph operations given a specific computational environment.

FIG. 4 illustrates an example flow diagram of an example process 400 for training a machine learning model to determine optimal placements of computational graph operations given a specific computational environment. For convenience, the process 400 will be described as being performed by a system of one or more computers, located in one or more locations, and programmed appropriately in accordance with this specification. For example, a model training system, e.g., the model training system 160 of FIG. 1, appropriately programmed, can perform process 400.

To train the machine learning model, the system initializes the values of a set of parameters the model, e.g., to randomly assigned or pre-determined values.

The system may determine current environment conditions (410) including the context information from the computational environment. In simulation, the system may generate the conditions for the simulated environment. The system also identifies computational graph data to assign to devices (415). In some implementations, the system generates weights for one or more optimization goals when the model expects weights as input.

The system generates a model input from the current environment conditions and the computational graph data. The environmental conditions and the graph to be processed should ideally be from real usage—e.g., a model running in a camera application under a set of conditions on real devices. These conditions can be logged anonymously. Then the system can take the model/graph and conditions and run simulations to train the operation placement model.

The system generates an assignment for the computational graph data by processing the model input using the model to predict assignments in accordance with the current values of the model parameters (425).

The system then determines a reward based on the results of the real or simulated execution according to the assignment (430).

The reward reflects how well the assignments satisfy the constraints of an optimization goal or set of optimization goals. In particular, the reward function includes a respective term for each of the optimization goals. Each optimization goal is associated with a measurable metric (e.g., time spent for execution, amount of data transmitted, and battery usage for the local device) and the term corresponding to the optimization goal in the reward function is a function of the measurable metric.

Thus, the system measures the metrics associated with each optimization goal and then computes the reward.

More specifically, the reward may be a weighted sum of, for each goal, a function of the measured metric for the goal. When the model is not configured to receive the weights as an input, the weights are fixed or, in some cases, annealed during the training. In cases where the model is configured to receive weights as input, the weights from the input are used when determining the reward.

The system then updates the current values of the model parameters based on the reward using a reinforcement learning algorithm (440). That is, the system updates, using the reinforcement learning algorithm, the current values of the model parameters so that the model generates placements that result in an increased reward being generated. For example, the reinforcement learning algorithm can be a conventional actor-critic algorithm such as the actor-critic reference disclosed by Sutton, R. and Barto, A. in "Reinforcement Learning: an Introduction." (MIT Press, 1998). In some implementations, the algorithm may be one as disclosed by Lillicrap et al. in "Continuous control with Deep Reinforcement Learning" https://arxiv.org/abs/1509.02971. In other implementations, the algorithm may be the algorithm disclosed by Mnih et al. in "Human-Level Control Through Deep Reinforcement Learning," https://storage.googleapis.com/deepmind-media/dqn/DQNNaturePaper.pdf. In still other implementations, the algorithm may be the algorithm disclosed by Foerster et al. in "Counterfactual Multi-Agent Policy Gradients," https://arxiv.org/abs/1705.08926. The algorithm may also be the algorithm disclosed by Mnih et al. in "Asynchronous Methods for Deep Reinforcement Learning," https://arxiv.org/abs/1602.01783.

In some implementations, in order to ensure that the space of possible assignments is sufficiently explored during the training of the model, the system incorporates an exploration policy into the training that ensures that assignments other than those that the model currently predicts would be the best assignment can be selected. For example, in certain iterations of the training process 400, the system may randomly select an assignment rather than selecting the assignment generated by the model. As another example, the system may include a term in the reward function that increases the reward when a new or rarely seen assignment is selected.

The system repeats the training process 400 many times for different environment conditions and computational graphs to train the model to effectively account for numerous computational graph tasks being executed in a variety of computational environments.

In some implementations, the system trains multiple different models having different architectures and then selects the best-performing model as the final model.

The trained model can then predict placement assignments for any computational graph task in any given computational environment. For example, the model can determine the optimal placement of a computationally-intensive task from a computer game running on a user's mobile device given low battery power of the user's mobile device. The model can take in context information of the computational environment such as connectivity of the mobile device to the Internet or mobile network (e.g., 4G, 5G, or LTE) and availability and capabilities of remote devices to perform the computationally-intensive task. The model may weigh having to send data from the user's device to a remote device against the battery savings of performing the task remotely. The model can then predict the best operational assignments based on battery savings and overall processing time.

Embodiments of the subject matter and the functional operations described in this specification can be implemented in digital electronic circuitry, in tangibly-embodied computer software or firmware, in computer hardware, including the structures disclosed in this specification and their structural equivalents, or in combinations of one or more of them. Embodiments of the subject matter described in this specification can be implemented as one or more computer programs, i.e., one or more modules of computer program instructions encoded on a tangible non-transitory storage medium for execution by, or to control the operation of, data processing apparatus. The computer storage medium can be a machine-readable storage device, a machine-readable storage substrate, a random or serial access memory device, or a combination of one or more of them. Alternatively or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus.

The term "data processing apparatus" refers to data processing hardware and encompasses all kinds of apparatus, devices, and machines for processing data, including by way of example a programmable processor, a computer, or multiple processors or computers. The apparatus can also be, or further include, special purpose logic circuitry, e.g., an FPGA (field programmable gate array) or an ASIC (application-specific integrated circuit). The apparatus can optionally include, in addition to hardware, code that creates an execution environment for computer programs, e.g., code that constitutes processor firmware, a protocol stack, a database management system, an operating system, or a combination of one or more of them.

A computer program, which may also be referred to or described as a program, software, a software application, an app, a module, a software module, a script, or code, can be written in any form of programming language, including compiled or interpreted languages, or declarative or procedural languages; and it can be deployed in any form, including as a stand-alone program or as a module, component, subroutine, or other unit suitable for use in a computing environment. A program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub-programs, or portions of code. A computer program can be deployed to be executed on one computer or on multiple computers that are located at one site or distributed across multiple sites and interconnected by a data communication network.

The processes and logic flows described in this specification can be performed by one or more programmable computers executing one or more computer programs to perform functions by operating on input data and generating output. The processes and logic flows can also be performed by special purpose logic circuitry, e.g., an FPGA or an ASIC, or by a combination of special purpose logic circuitry and one or more programmed computers.

Computers suitable for the execution of a computer program can be based on general or special purpose microprocessors or both, or any other kind of central processing unit. Generally, a central processing unit will receive instructions and data from a read-only memory or a random access memory or both. The essential elements of a computer are a central processing unit for performing or executing instructions and one or more memory devices for storing instructions and data. The central processing unit and the memory can be supplemented by, or incorporated in, special purpose logic circuitry. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device, e.g., a universal serial bus (USB) flash drive, to name just a few.

Computer-readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's device in response to requests received from the web browser. Also, a computer can interact with a user by sending text messages or other forms of message to a personal device, e.g., a smartphone, running a messaging application, and receiving responsive messages from the user in return.

Embodiments of the subject matter described in this specification can be implemented in a computing system that includes a back-end component, e.g., as a data server, or that includes a middleware component, e.g., an application server, or that includes a front-end component, e.g., a client computer having a graphical user interface, a web browser, or an app through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network (LAN) and a wide area network (WAN), e.g., the Internet.

The computing system can include clients and servers. A client and server are generally remote from each other and typically interact through a communication network. The relationship of client and server arises by virtue of computer programs running on the respective computers and having a client-server relationship to each other. In some embodiments, a server transmits data, e.g., an HTML page, to a user device, e.g., for purposes of displaying data to and receiving user input from a user interacting with the device, which acts as a client. Data generated at the user device, e.g., a result of the user interaction, can be received at the server from the device.

In addition to the embodiments of the attached claims and the embodiments described above, the following numbered embodiments are also innovative:

Embodiment 1 is a method comprising: obtaining data characterizing a computational graph comprising a plurality of nodes representing operations and directed edges representing data dependencies; receiving context information for a computational environment in which to perform the operations of the computational graph, the context information including data representing a network connecting a plurality of computing devices in the computational environment; generating a model input comprising at least the context information and the data characterizing the computational graph; processing the model input using a machine learning model to generate an output defining placement assignments of the operations of the computational graph to the plurality of computing devices; and assigning operations of the computational graph to the plurality of computing devices according to the defined placement assignments.

Embodiment 2 is the method of embodiment 1, wherein the machine learning model has been trained to generate placement assignments for the operations of the computational graph that satisfy at least one pre-determined weight for one or more optimization goals.

Embodiment 3 is the method of any one of embodiments 1 or 2, further comprising prior to processing the model input using the machine learning model: receiving a constraint that identifies at least one optimization goal for graph processing; and generating the model input using the constraint in addition to the context information and the data characterizing the computational graph.

Embodiment 4 is the method of embodiment 3, wherein the constraint is in the form of a vector that assigns a respective weight to one or more optimization goals.

Embodiment 5 is the method of any one of embodiments 2 through 4, wherein the one or more optimization goals includes one or more of: latency, battery, energy impact, bandwidth, and computational time.

Embodiment 6 is the method of any one of embodiments 1 through 5, wherein the context information further comprise information defining at least one computational capability of the plurality of computing devices in the computational environment including available battery life, available processing capability, available storage capacity, available memory, or network speed.

Embodiment 7 is the method of any of embodiments 1 through 6, wherein the data representing a network connecting the plurality of computing devices includes data representing one or more of: measured or expected latency of the network, network speed, and available computing devices on the network.

Embodiment 8 is the method of any of embodiments 1 through 7, wherein the computational graph comprises a plurality of repeated operations and further comprising: after determining a placement assignment for one of the repeated operations, assigning subsequent repeated operations to a same placement assignment for a predetermined number of computational time steps.

Embodiment 9 is the method of embodiment 8, further comprising after the predetermined number of computational time steps, reevaluating the placement assignment of the repeated operations.

Embodiment 10 is the method of any one of embodiments 1 through 9, wherein the computational graph or a sub-graph thereof represents a particular task and further comprising: after determining placement assignments for the operations of the computational graph or sub-graph thereof, creating a policy that defines placement assignments of the operations of the particular task from the determination of placement assignments for the operations; receiving data characterizing a second computational graph or sub-graph representing the same particular task as the computational graph comprising a plurality of nodes representing operations and directed edges representing data dependencies or the sub-graph thereof; and determining placement assignments of the operations of the second computational graph or sub-graph from the created policy.

Embodiment 11 is the method of embodiment 10, further comprising: reevaluating the created policy after a predetermined number of computational time steps.

Embodiment 12 is the method of embodiment 11, wherein the predetermined number of computational time steps is determined based on a cost associated with re-computing the policy.

Embodiment 13 is a system comprising: one or more computers; and one or more storage devices storing instructions that are operable, when executed on one or more computers, to cause the one or more computers to perform any one of embodiments 1 through 12.

Embodiment 14 is one or more non-transitory computer-readable storage mediums comprising instructions stored thereon that are executable by a processing device and upon such execution cause the processing device to perform any one of claims 1 through 12.

While this specification contains many specific implementation details, these should not be construed as limitations on the scope of any invention or on the scope of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially be claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In some cases, multitasking and parallel processing may be advantageous.

What is claimed is:

1. A computer-implemented method for training a machine learning model, the training comprising:
    obtaining data characterizing a computational graph comprising a plurality of nodes representing operations and directed edges representing data dependencies;
    receiving context information for a computational environment in which to perform the operations of the computational graph, the context information including data representing a network connecting a plurality of computing devices in the computational environment;
    generating, as a training example for training the machine learning model, a model input based at least upon the context information and the data characterizing the computational graph, wherein the machine learning model has a plurality of model parameter values;
    processing the training example using the machine learning model in accordance with the plurality of model parameter values to generate an output defining placement assignments of the operations of the computational graph to the plurality of computing devices, each placement assignment of the placement assignments specifying an assignment of a respective operation in the computational graph to be performed by one or more respective computing devices in the computational environment;
    calculating a reward for the output that measures a quality of the placement assignments defined in the output, and
    updating the plurality of model parameter values based on the reward using a reinforcement learning algorithm.

2. The computer-implemented method of claim 1, wherein the reward is generated from respective metric values corresponding to one or more predetermined goals, each respective metric value for a corresponding goal of the one or more predetermined goals representing a level to which a placement assignment satisfies the corresponding goal.

3. The computer-implemented method of claim 2, wherein the reward is determined from a reward function that sums the respective metric values corresponding to the one or more predetermined goals in accordance with weights assigned to the one or more predetermined goals.

4. The computer-implemented method of claim 3, wherein the reward function allows exploring in a prediction space for other possible placement assignments, by including in the reward function a term that would increase a reward when an assignment never predicted by the machine learning model is selected.

5. The computer-implemented method of claim 1, further comprising, prior to processing the training example using the machine learning model:
    receiving a constraint that identifies at least one predetermined goal for performed operations of the computational graph; and
    generating the training example using the constraint in addition to the context information and the data characterizing the computational graph.

6. The computer-implemented method of claim 2, wherein the one or more predetermined goals includes one or more of: latency, battery, energy impact, bandwidth, and computational time.

7. The computer-implemented method of claim 1, wherein the context information further comprises information defining at least one computational capability of the plurality of computing devices in the computational environment including available battery life, available processing capability, available storage capacity, available memory, or network speed.

8. The computer-implemented method of claim 1, wherein the data representing a network connecting the plurality of computing devices includes data representing one or more of: measured or expected latency of the network, network speed, and available computing devices on the network.

9. The computer-implemented method of claim 1, wherein after the machine learning model has been trained, the method further comprises:
generating a model input comprising at least the context information and the data characterizing the computational graph;
processing the model input using the trained machine learning model to generate another output defining placement assignments of the operations of the computational graph to the plurality of computing devices, each placement assignment of the placement assignments specifying an assignment of a respective computational operation in the computational graph to be performed by one or more respective computing devices in the computational environment; and
assigning operations of the computational graph to the plurality of computing devices according to the defined placement assignments.

10. A system comprising:
one or more computers; and
one or more storage devices storing instructions that are operable, when executed on one or more computers, to cause the one or more computers to perform operations comprising:
obtaining data characterizing a computational graph comprising a plurality of nodes representing operations and directed edges representing data dependencies;
receiving context information for a computational environment in which to perform the operations of the computational graph, the context information including data representing a network connecting a plurality of computing devices in the computational environment;
generating, as a training example for training a machine learning model, a model input based at least upon the context information and the data characterizing the computational graph, wherein the machine learning model has a plurality of model parameter values;
processing the training example using the machine learning model in accordance with the plurality of model parameter values to generate an output defining placement assignments of the operations of the computational graph to the plurality of computing devices, each placement assignment of the placement assignments specifying an assignment of a respective operation in the computational graph to be performed by one or more respective computing devices in the computational environment;
calculating a reward for the output that measures a quality of the placement assignments defined in the output, and
updating the plurality of model parameter values based on the reward using a reinforcement learning algorithm.

11. The system of claim 10, wherein the reward is generated from respective metric values corresponding to one or more predetermined goals, each respective metric value for a corresponding goal of the one or more predetermined goals representing a level to which a placement assignment satisfies the corresponding goal.

12. The system of claim 11, wherein the reward is determined from a reward function that sums the respective metric values corresponding to the one or more predetermined goals in accordance with weights assigned to the one or more predetermined goals.

13. The system of claim 12, wherein the reward function allows exploring in a prediction space for other possible placement assignments, by including in the reward function a term that would increase a reward when an assignment never predicted by the machine learning model is selected.

14. The system of claim 10, wherein the operations further comprise, prior to processing the training example using the machine learning model:
receiving a constraint that identifies at least one predetermined goal for performed operations of the computational graph; and
generating the training example using the constraint in addition to the context information and the data characterizing the computational graph.

15. The system of claim 11, wherein the one or more predetermined goals includes one or more of: latency, battery, energy impact, bandwidth, and computational time.

16. The system of claim 10, wherein the context information further comprises information defining at least one computational capability of the plurality of computing devices in the computational environment including available battery life, available processing capability, available storage capacity, available memory, or network speed.

17. The system of claim 10, wherein the data representing a network connecting the plurality of computing devices includes data representing one or more of: measured or expected latency of the network, network speed, and available computing devices on the network.

18. The system of claim 10, wherein after the machine learning model has been trained, the operations further comprise:
generating a model input comprising at least the context information and the data characterizing the computational graph;
processing the model input using the trained machine learning model to generate another output defining placement assignments of the operations of the computational graph to the plurality of computing devices, each placement assignment of the placement assignments specifying an assignment of a respective computational operation in the computational graph to be performed by one or more respective computing devices in the computational environment; and
assigning operations of the computational graph to the plurality of computing devices according to the defined placement assignments.

19. One or more non-transitory computer-readable storage media encoded with instructions that, when executed by one or more computers, cause the one or more computers to perform operations comprising:
obtaining data characterizing a computational graph comprising a plurality of nodes representing operations and directed edges representing data dependencies;

receiving context information for a computational environment in which to perform the operations of the computational graph, the context information including data representing a network connecting a plurality of computing devices in the computational environment;

generating, as a training example for training a machine learning model, a model input based at least upon the context information and the data characterizing the computational graph, wherein the machine learning model has a plurality of model parameter values;

processing the training example using the machine learning model in accordance with the plurality of model parameter values to generate an output defining placement assignments of the operations of the computational graph to the plurality of computing devices, each placement assignment of the placement assignments specifying an assignment of a respective operation in the computational graph to be performed by one or more respective computing devices in the computational environment;

calculating a reward for the output that measures a quality of the placement assignments defined in the output, and updating the plurality of model parameter values based on the reward using a reinforcement learning algorithm.

20. The one or more non-transitory computer-readable storage media of claim 19, wherein after the machine learning model has been trained, the operations further comprise:

generating a model input comprising at least the context information and the data characterizing the computational graph;

processing the model input using the trained machine learning model to generate another output defining placement assignments of the operations of the computational graph to the plurality of computing devices, each placement assignment of the placement assignments specifying an assignment of a respective computational operation in the computational graph to be performed by one or more respective computing devices in the computational environment; and assigning operations of the computational graph to the plurality of computing devices according to the defined placement assignments.

* * * * *